US009572011B2

(12) United States Patent
Jiang et al.

(10) Patent No.: US 9,572,011 B2
(45) Date of Patent: Feb. 14, 2017

(54) VALUE ADDED MODULE IN PREDICTIVE INTELLIGENCE

(75) Inventors: John Yue Jun Jiang, Danville, CA (US); David Gillot, Brussels (BE)

(73) Assignee: Mobileum, Inc., Santa Clara, CA (US)

( * ) Notice: Subject to any disclaimer, the term of this patent is extended or adjusted under 35 U.S.C. 154(b) by 0 days.

(21) Appl. No.: 14/131,179

(22) PCT Filed: Jul. 5, 2012

(86) PCT No.: PCT/US2012/045585
§ 371 (c)(1),
(2), (4) Date: Aug. 15, 2014

(87) PCT Pub. No.: WO2013/006714
PCT Pub. Date: Jan. 10, 2013

(65) Prior Publication Data
US 2014/0349641 A1 Nov. 27, 2014

Related U.S. Application Data

(60) Provisional application No. 61/504,457, filed on Jul. 5, 2011.

(51) Int. Cl.
*H04W 4/00* (2009.01)
*H04W 8/04* (2009.01)
(Continued)

(52) U.S. Cl.
CPC ................ *H04W 8/04* (2013.01); *H04W 4/02* (2013.01); *H04W 12/12* (2013.01); *H04W 24/08* (2013.01);
(Continued)

(58) Field of Classification Search
CPC ...... H04W 8/04; H04W 64/006; H04W 12/12; H04W 24/08; H04W 4/02; H04M 3/2281
(Continued)

(56) References Cited

U.S. PATENT DOCUMENTS 7,222,192 B2 * 5/2007 Allison et al. ................ 709/245
2008/0207181 A1 8/2008 Jiang
(Continued)

FOREIGN PATENT DOCUMENTS

WO WO 2009/015273 A2 1/2009

OTHER PUBLICATIONS

Supplementary Search Report mailed Mar. 25, 2015 for International Patent Application No. 12807653.6.
(Continued)

*Primary Examiner* — Dhaval Patel
(74) *Attorney, Agent, or Firm* — Arent Fox LLP

(57) ABSTRACT

The present invention is provides towards a method and system for facilitating roaming tests for an operator in a telecommunication network. The method includes detecting a location update message of a subscriber to an HLR while switching from a first MSG/VLR to a second MSG/VLR, The method further includes holding by a value added module, a cancel location message being sent from the HLR to the first MSG/VLR. The method further includes conducting the roaming tests by the value added module, using the subscriber's profile data obtained from the first MSG/VLR. Further in the method the value added module releases the cancel location message to the first MSC/VLR.

33 Claims, 4 Drawing Sheets

(51) Int. Cl.
*H04W 4/02* (2009.01)
*H04W 12/12* (2009.01)
*H04W 24/08* (2009.01)
*H04W 64/00* (2009.01)
*H04M 7/00* (2006.01)
*H04W 24/06* (2009.01)

(52) U.S. Cl.
CPC ......... *H04W 64/006* (2013.01); *H04M 7/0057* (2013.01); *H04M 2207/18* (2013.01); *H04W 24/06* (2013.01)

(58) Field of Classification Search
USPC ................. 455/432.3, 406, 405, 433, 432.1, 466,455/435.1, 436, 439
See application file for complete search history.

(56) References Cited

U.S. PATENT DOCUMENTS

| | | |
|---|---|---|
| 2009/0061854 A1 | 3/2009 | Gillot et al. |
| 2009/0061860 A1 | 3/2009 | Jiang |
| 2009/0190468 A1* | 7/2009 | Gillot .................... H04W 24/04 370/216 |
| 2011/0081907 A1* | 4/2011 | Yang et al. ................... 455/433 |
| 2011/0136486 A1 | 6/2011 | Beattie, Jr. et al. |

OTHER PUBLICATIONS

International Search Report, United States Patent Application No. PCT/2012/045585 dated Sep. 21, 2012.

* cited by examiner

VALUE ADDED MODULE IN PREDICTIVE INTELLIGENCE

CROSS-REFERENCE TO RELATED APPLICATIONS

This application is a National Stage entry of U.S. Patent Application No. PCT/US2012/045585, filed Jul. 5, 2012, which claims priority to U.S. Patent Application No. 61/504,457, filed Jul. 5, 2011. The disclosures of the prior applications are hereby incorporated in their entirety by reference.

FIELD OF THE INVENTION

The present invention generally relates to roaming services in telecommunication network. More specifically, the invention relates to method and system for facilitating roaming tests for an operator in a telecommunication network.

BACKGROUND OF THE INVENTION

As telecommunication technology has progressed, though on one hand it has proved immensely beneficial for all, on other hand it has given rise to various types of frauds being done in these telecommunication networks. One such fraud is called termination bypass fraud where fraudsters change the termination leg of a call (mobile call or landline call) to avoid paying termination charge to a terminating operator for this terminated call. These calls can be international or national calls that are terminated at the terminating operator. As a result of this, operators need to conduct various roaming tests to identify such frauds in the telecommunication network.

In one of the previous patents from inventors of a referenced application, a solution has been provided for developing a "A single operator and network side solution for inbound and outbound roaming tests and discoveries of roaming partner services and frauds without involving remote probes or real roamer traffic". This solution is hereinafter, referred to as "Predictive Intelligence" or "PI".

The limitation of call generation based bypass detection methods today is that because they involve only test calls with test numbers, smart bypass fraudsters can examine the patterns of these test numbers and decide to blacklist them for future bypasses. Some of the patterns on these test numbers are either they are called too many times or they are not answered many times etc. As a result, the call generation methods lose their effectiveness in bypass detection. Even though more test numbers can be introduced, the same issue of getting detected by the bypass fraudster will rise again. Besides the fact that the test numbers are limited and each time they are used, it involves more work from the operators of these numbers, thereby creating a non-scalable solution.

Another previous patent from the inventors of this patent, titled "Advanced PI" was able to overcome the limitation of call generation based bypass detection method, by applying bypass detection in a stealth manner, thus making it difficult for fraudsters to detect that they are being tested. The Advanced PI patent was creating dummy subscribers, through signaling, as roaming agents to conduct these roaming tests. As the roaming agents were dummy subscribers there was no formal location area stored in MSC/VLR. In order to conduct these tests a virtual subscriber had to be created in the HLR, and for that a fake MT call was made to the VLR. As a standard process, the HLR would issue a PRN to the VLR to get MSRN of the subscriber. Now since the VLR does not have subscriber profile, it would issue a Restore Subscriber Data (RSD) message to HLR to get profile of the virtual subscriber restored. Since the subscriber's location info is not stored in VLR, some operators may want to avoid searching their complete network for the missing subscribers and may not return any MSRN.

Even when the operators page a location area to know the subscriber location, then the MSC has to page all location areas using Search MS message. This requires a lot of paging. In some cases, many MSC /VLRs may be shared/pooled, and the whole country may even share the same MSC. In such situation, in order to locate the subscriber, entire country would have to be paged, which is unrealistic. In some cases, it has also been observed, where PRN results in "system failure", but RSD happens, therefore validity of the VLR, profile download, SMS etc. can be evaluated, not receiving any MSRN limits the missing control on voice calls.

It has been also observed during PI and Advanced PI deployments that large number of MSC/VLRs deviate from the "VLR restoration" standard. As a result of which, the VLRs do not allow MAP RSD. Statistically, more than 40% of VLRs today do not allow creation of virtual subscribers. Assuming that worldwide we have 2000 VLRs, then only 60% of them can be tested.

The PI deployment in general relies on Restoration Procedure standard. The procedure for restoring a subscriber profile is defined in the ETSI TS123.007 document. The procedure is complete—i.e. actually restore the subscriber profile using the RSD message—for a VLR: If the indicator "Subscriber Data Confirmed by HLR" is "Not Confirmed" the VLR requests authentication data, if required and still not available and subscriber data from the HLR.

However, the same procedure doesn't exist for SGSN—i.e. the RSD procedure does not exist for SGSN. In other words, while MT calls triggers a profile restoration from the HLR, there is no MT activity at SGSN having the same effect:

For the MT SMS: It rejects the SMS request and returns a failure report with cause value "Unidentified Subscriber" to the SMS gateway MSC indicating unsuccessful delivery of the SMS For the MT user data session: When the SGSN receives a tunnel PDU for which no PDP context exists it discards the tunnel PDU and sends an Error indication message to the originating GGSN For MT Paging via MSC/VLR (Gs interface): If the "SGSN-Reset" indicator is set to "false" and the IMSI is unknown or the MS is marked as GPRS or non-GPRS detached by the SGSN, the paging request is rejected.

All these situations weaken the overall business case for using Advanced PI. In accordance with the foregoing, there is a need in the art of a system and a method for allowing an operator to conduct roaming tests using necessary intelligence to deal with above-mentioned problems.

SUMMARY

The present invention is directed towards a method and system for facilitating roaming tests for an operator in a telecommunication network. The method includes detecting a location update message of a subscriber to an HLR while switching from a first MSC/VLR to a second MSC/VLR. The method further includes holding by a value added module, a cancel location message being sent from the HLR to the first MSC/VLR. The method further includes conducting the roaming tests by the value added module, using the subscriber's profile data obtained from the first MSC/VLR. Further in the method the value added module releases the cancel location message to the first MSC/VLR.

The present invention in another embodiment also provides a method for facilitating roaming tests for an operator in a telecommunication network. The method includes detecting a location update message of a subscriber to an HLR while switching from a first MSC/VLR to a second MSC/VLR. The method further includes sending by a value added module, an RSD message to the HLR to relay the subscriber's profile to the second MSC/VLR. The method further includes sending by the value added module, a purge message on the subscriber to the HLR. Thereafter, the method includes conducting the roaming tests by the value added module, using the subscriber's profile data obtained from the first MSC/VLR. Subsequently, the method includes sending by the value added module, a cancel location message to the HLR to remove the subscriber's profile in the first MSC/VLR. The method further includes generating by the value added module, a location update message to update second MSC/VLR at the HLR.

The system of the present invention, in its various embodiments facilitates roaming tests for an operator in telecommunication networks, using a value added module. The value added module detects a location update message of a subscriber to an HLR while switching from a first MSC/VLR to a second MSC/VLR. The value added module further holds a cancel location message being sent from the HLR to the first MSC/VLR. The value added module further conducts the roaming tests, using the subscriber's profile data obtained from the first MSC/VLR. Thereafter, the value added module further releases the cancel location message to the first MSC/VLR.

The system of the present invention, in its various embodiments detects bypass frauds and SIM box frauds in telecommunication networks by using real subscribers as roaming agents.

In accordance with various embodiments of the present invention, the value added module interfaces with Predictive Intelligence module to execute one or more steps of the method. The present invention is hereinafter, interchangeably, referred to as PI-VAM.

BRIEF DESCRIPTION OF DRAWINGS

In the drawings, the same or similar reference numbers identify similar elements or acts.

DETAILED DESCRIPTION

Figure 1:
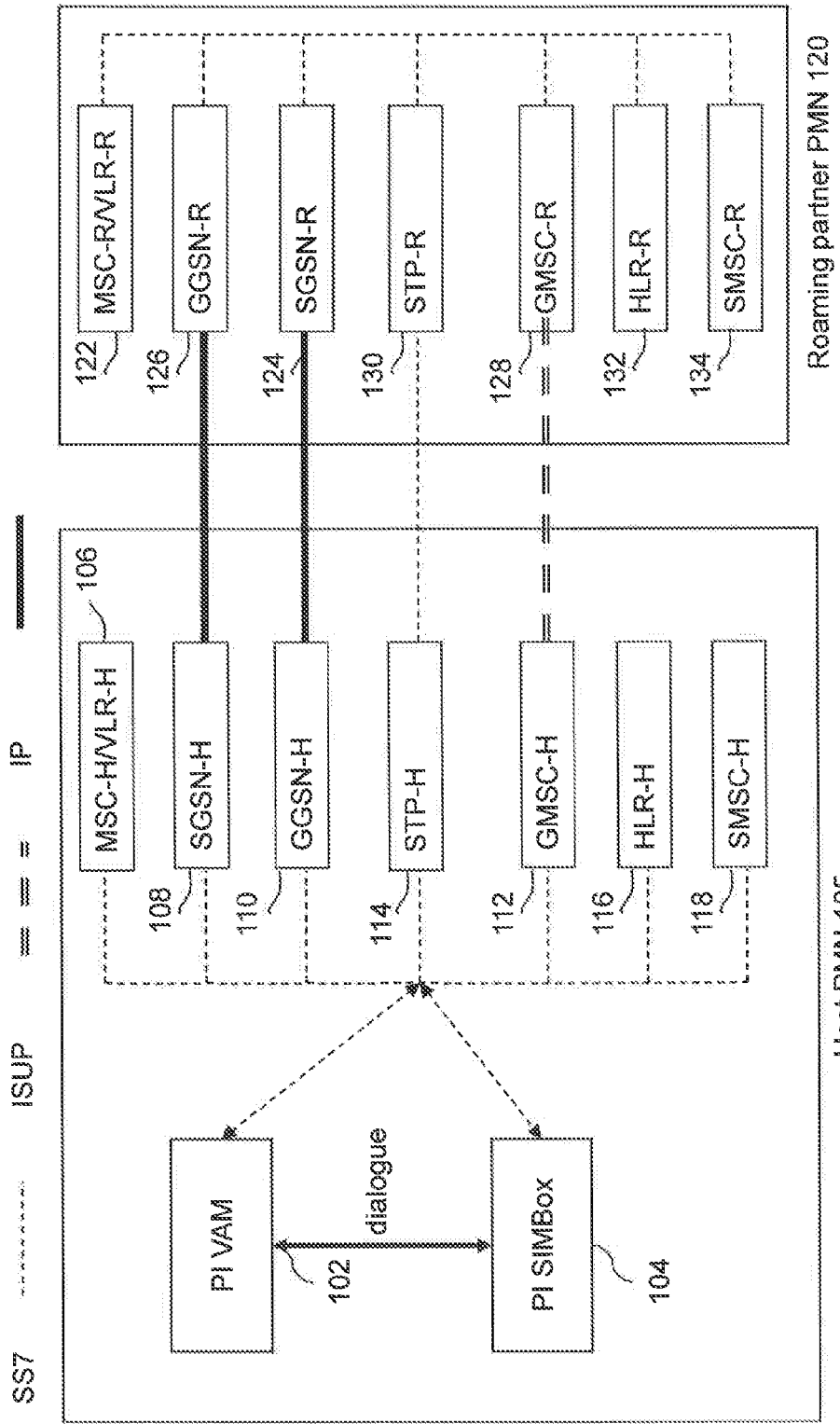
FIG. 1 illustrates a system for implementing the PI-VAM solution, in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system and a method for facilitating roaming tests for an operator in the telecommunication network. The general idea of this invention is to use real subscribers as roaming agents in roaming partner of a home operator (i.e., a host operator) that deploys this invention to detect frauds and conduct these tests within the home operator network. This thus helps in preventing revenue losses by controlling all frauds before any real fraud occurs. The present invention further helps the hosting operator to increase revenue, reduce loss, prevent fraud and improve customer experience and quality.

The host network operator deploys a Predictive Intelligence Value Added Module solution, described in this present invention, (hereinafter, referred as PI VAM) for facilitating roaming tests in the telecommunication network. The host network operator deploys the value added module of the PI VAM either within the host network or at a centralized location that is connected to the host network. In the latter implementation, the value added module is able to serve multiple home operators in a country.

The PI VAM method includes using value added module to detect a location update message of a subscriber to an HLR, while switching from a first MSC/VLR to second MSC/VLR. The value added module holds the cancel location message from being sent from the HLR to the first MSC/VLR. Thereafter, the value added module conducts the roaming tests using subscriber's profile data obtained from the first MSC/VLR. Once the tests are done, the value added module releases the cancel location message to the first MSC/VLR.

In its various implementation of the present invention, advanced PI solution is signaling based and is deployed for the terminating country of the home operator conducting the roaming tests. It will apparent to a person skilled in the art that the invention can also be used for non-signaling based solution although it will then require additional configuration and more manual control is required.

To simplify the description in the document, we explain the various embodiments of the present invention, by interchangeably using GSM SIM box detection and termination bypass detection as they equally illustrate the invention. However, it will be appreciated by a person skilled in the art the present invention can be similarly generalized to other lines of bypasses detection, including but not limited to, fixed line bypass, CDMA bypass, GSM bypass on national and international call circuits.

FIG. 1 illustrates a system 100 that implements the PI VAM in accordance with an embodiment of the present invention. PI Value Added Module 102 interfaces with PI SIM box detector 104 (from the previous application, referenced herein) to conduct various roaming tests by an operator. A host PMN 105 operator, who may perform the roaming tests on its inbound and outbound roamers, may deploy both PI VAM 102 and PI SIMBox 104. Thus, host PMN 105 acts as a Home PMN (HPMN) of the outbound roamers, whereas roaming partner networks in which these outbound roamers may roam act as Visited PMNs (VPMNs). Accordingly, host PMN 105 acts as a VPMN for the inbound roamers, whereas roaming partner networks to which these inbound roamers belong act as HPMNs.

Host PMN 105 further includes a Mobile Switching Center (MSC)/Visiting Location Register (VLR) 106, a Serving GPRS Support Node (SGSN) 108, a Gateway GPRS Support Node (GGSN) 110, a Gateway MSC (GMSC) 112, a roaming Signal Transfer Point (STP) 114, a Home Location Register (HLR) 116 and a Short Message Service Center (SMSC) 118. Since network elements MSC/VLR 106, SGSN 108, GGSN 110, GMSC 112, STP 114, HLR 116 and SMSC 118 reside in Host PMN 105, they are hereinafter referred to as MSC-HN/VLR-H 106, SGSN-H 108, GGSN-H 110, GMSC-H 112, STP-H 114, HLR-H 116 and SMSC-H 118, respectively. These network elements communicate with each other over a Signaling System 7 (SS7) link (represented by dashed lines in FIG. 1), except that SGSN-H 108 communicates with GGSN-H 110 via an Internet Protocol (IP) link (represented by solid lines in FIG. 1).

System 100 further includes a roaming partner PMN 120 (i.e., the roaming partner network) that is associated with host PMN 104. It will be apparent to a person skilled in the art that system 100 may include various other roaming partner networks. However, for the sake of convenience, this embodiment considers only one roaming partner network (i.e., roaming partner PMN 120). Roaming partner PMN 120 includes a MSC/VLR 122, a SGSN 124, a GGSN 126, a GMSC 128, an STP 130, an HLR 132 and an SMSC 134. Since network elements MSC/VLR 122, SGSN 124, GGSN 126, GMSC 128, STP 130, HLR 132 and SMSC 134 reside in roaming partner PMN 120, they are hereinafter referred to as MSC-R/VLR-R 122, SGSN-R 124, GGSN-R 126, GMSC-R 128, STP-R 130, HLR-R 132 and SMSC-R 134, respectively.

All these network elements of roaming partner PMN 120 communicate with each other over the SS7 link, except that SGSN-R 124 communicates with GGSN-R 126 via the IP link. Further, as shown in FIG. 1, the network elements of roaming partner PMN 120 also communicate with the network elements of host PMN 105. For example, GMSC-R 128 communicates with GMSC-H 112 over an ISDN User Part Protocol (ISUP) link, whereas SGSN-R 124 and GGSN-R 126 communicate with GGSN-H 110 and SGSN-H 108, respectively via the IP link. Other network elements of roaming partner PMN 120 (e.g., MSC-R/VLR-R 122) communicate with various other network elements of host PMN 105 (e.g., HLR-H 116) via the SS7 link. It will also be apparent to a person skilled in the art that host PMN 105 and roaming partner PMN 120 may also include various other network components (not shown in FIG. 1), depending on the architecture under consideration. In an embodiment of the present invention, various network elements of host PMN 105 and roaming partner PMN 120 are located in an IR.21 database (not shown in FIG. 1) such as RAEX IR.21. In an embodiment of the present invention, the IR.21 database is coupled to PI VAM 102.

PI VAM 102 connects with various components within host PMN 104 and roaming partner PMN 120 to conduct roaming tests on these subscribers. The primary objective of PI VAM 102 is to be able to deal with the MSC/VLRs that do not follow the VLR restoration procedure, i.e., are non-compliant and hence affecting the QoS testing needs of the deploying operator (i.e., host PMN 105). The PI VAM is triggered for specific VPMN/VLR (known to be non-responsive to restoration procedure) or alternatively as a fallback after standard PI application fails to create Roaming Agents. In another embodiment, the PI VAM is linked to the campaign manager that waits for a test campaign before taking action. In some embodiments, the PI VAM can be started immediately (assuming a roamer is present at the right location) or after the required event has occurred. The event may be, subscriber moving from a first MSC/VLR to a second MSC/VLR. In various embodiments of the invention, the first MSC/VLR and second MSC/VLR belong to same network or different networks. For example, first MSC/VLR may belong to host PMN 105, i.e., first MSC/VLR is MSC-H/VLR-H 106. The second MSC/VLR may belong to roaming partner PMN 120, i.e., second MSC/VLR is MSC-R/VLR-R 122.

The present invention provides multiple embodiments where the PI VAM solution is implemented for real subscriber when he is not reachable while roaming on the MSC/VLR. The implementation does not disturb the subscriber with test calls and hence a test is only conducted when the subscriber is known to be non-reachable. This situation is guaranteed at the moment a GSM LUP is observed from another MSC/VLR either from the same network or different network.

Figure 2:
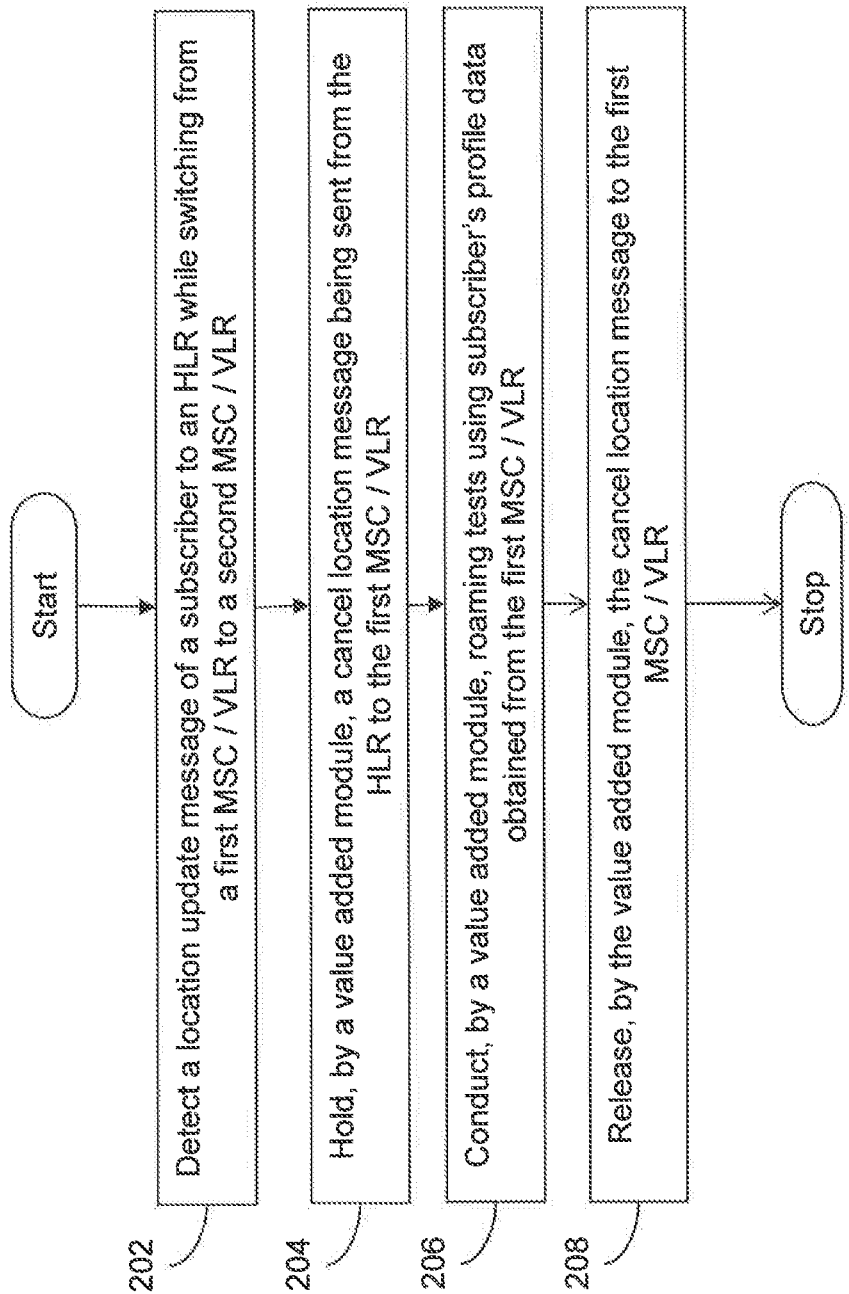
FIG. 2 represents a flowchart for facilitating roaming tests for an operator in a telecommunication network, in accordance with an embodiment of the present invention.

FIG. 2 represents a flowchart for facilitating roaming tests for an operator in a telecommunication network, in accordance with an embodiment of the present invention. For sake of convenience, hereinafter, PI VAM 102 is interchangeably referred to as VAM 102. As mentioned above, the roaming tests are conducted on non-compliant MSC/VLRs that do not follow the Restoration Procedure. These tests are conducted while a subscriber is switching from a first MSC (non-compliant) to a second MSC. At step 202, VAM 102 detects a location update message of a subscriber to an HLR while switching from a first MSC/VLR to a second MSC/VLR. In context of system 100, VAM 102 detects the LUP message of a subscriber of host PMN 105 while switching from its MSC/VLR-H 106 to MSC-R/VLR-R 122. In this embodiment, the MSC-H/VLR-H 106 is a non-compliant MSC/VLR and hence tests need to be conducted on this MSC/VLR.

In accordance with various embodiments of the present invention, there are multiple ways for the VAM 102 to detect the registration of the subscriber. In first embodiment, the VAM 102 may establish connection to existing probes to detect GSM LUP and GPRS LUP. In a second embodiment, the VAM 102 may establish connection to an existing Network Traffic Redirection (NTR) system to detect the GSM LUP and GPRS LUP. In a third embodiment, the VAM 102 may receive the GSM LUP and GPRS LUP from the NTR system routing. In a fourth embodiment, the VAM 102 may receive the GSM LUP and GPRS LUP due to routing by a STP. The STP could be dynamically configured with E.214 to send the GSM LUP and GPRS LUP to the VAM 102.

Once the LUP is received by the VAM 102, then at step 204, the VAM 102 holds the Cancel Loc message being sent from the HLR to the first MSC/VLR. VAM 102 holds the Cancel Loc message being sent from HLR-H 116 to MSC-H/VLR-H 106. In an alternate embodiment, when VAM 102 receives and hold the GSM LUP, it sends a Restore Subscriber Data (RSD) message to the HLR-H 116 to relay the subscriber's profile to second MSC/VLR, i.e., MSC-R/VLR-R 122. This avoids the HLR-H 116 to send Cancel Loc message to the first MSC/VLR.

Thereafter, at step 206, VAM 102 conducts roaming tests using the subscriber's profile data obtained from first MSC/VLR, i.e., MSC-H/VLR-H 106. The testing is done on the subscriber's profile in the first MSC/VLR. This allows the present invention to overcome the problem faced in previous patent for Predictive Intelligence, where virtual subscribers using signaling were used as roaming agents. Instead, in the current invention, real subscribers are used as roaming agent, and their profile information is used when it is no longer required by the MSC/VLR from where the subscriber moved out to a new MSC/VLR.

Once the tests are completed, at step 208, VAM 102 releases the Cancel Loc message (held at step 204) to the first MSC/VLR, i.e, MSC-H/VLR-H 106. This enables the MSC-H/VLR-H 106 to remove the subscriber's profile.

In another embodiment of the invention, VAM 102 may also send a PurgeMS message on the subscriber to HLR-H 116. This avoid any incoming calls on the first MSC/VLR, i.e., MSC-H/VLR-H 106. Once the roaming tests are done, VAM 102 (as in step 208) sends the Cancel Loc message to MSC-H/VLR-H 106. Thereafter, VAM 102 generates a LUP to update the second MSC/VLR, i.e., MSC-R/VLR-R 122 at the HLR-H 116.

In accordance with various embodiments of the present invention, PI VAM 102 works in conjunction with PI SIMBox 104 to execute one or more of the process steps mentioned in conjunction with FIG. 2.

Figure 3:
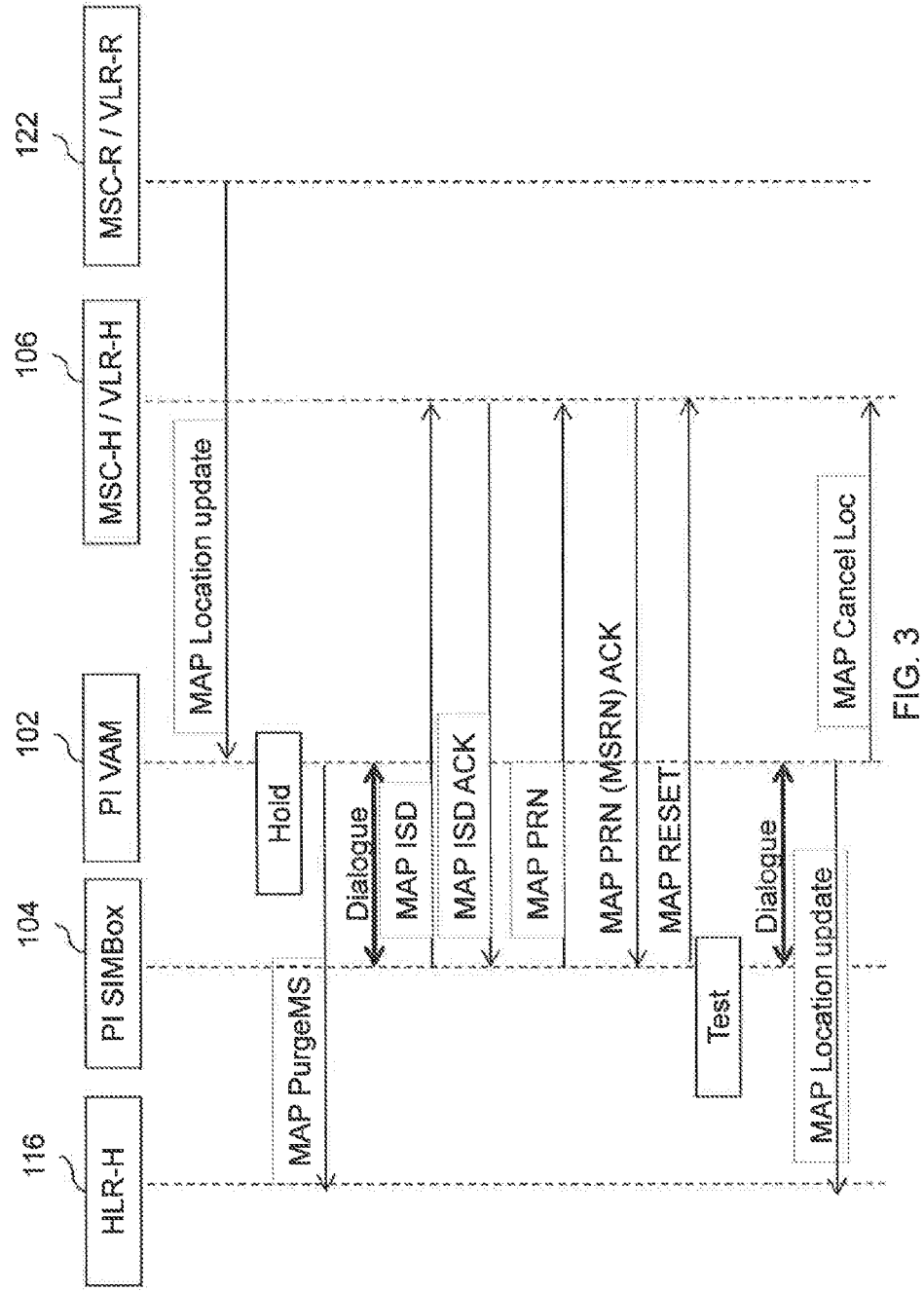
FIG. 3 represents a flow diagram for conducting roaming tests when a subscriber moves from a first MSC/VLR to a second MSC/VLR, in accordance with an embodiment of the present invention.

FIG. 3 represents a flow diagram for conducting roaming tests when a subscriber moves from a first MSC/VLR to a second MSC/VLR, in accordance with an embodiment of the present invention. As explained above, the rationale for conducting the roaming tests is to use a real subscriber as a roaming agent. When the subscriber is moving from first MSC to second MSC, we utilize the subscriber profile in the first MSC to conduct these test.

As shown in FIG. 3, when the subscriber moves from MSC-H/VLR-H 106 to MSC-R/VLR-R 122, the MSC-R/VLR-R 122 fires a MAP Location update towards HLR-H 116. However, since PI VAM 102 is deployed in in-signaling path, the PI VAM 102 is able to hold the MAP LUP message. In another embodiment of the present invention, the PI VAM 102 uses PI SIMBox 104 for controlling LUP messages and rejects any new LUP message from a different MSC/VLR. Alternatively, PI VAM 102 could use NTR systems to track potential IMSI for the campaign and inform the NTR systems that new LUP attempt from these IMSIs would required to be on hold or rejected.

When the LUP is delayed, the PI VAM 102 and PI SIMbox 104 conduct the roaming tests. However, before conducting these tests, PI VAM 102 needs to remove current MSC-H/VLR-H 106 information from HLR-H 116. In order to do so, PI VAM 102 sends a MAP PurgeMS message to HLR-H 116 to ensure that no more incoming calls (MT calls race condition) are received for the subscriber in MSC-H/VLR-H 106. Subsequently, PI VAM 102 sends appropriate ISD message to MSC-H/VLR-H 106 for adjusting the real subscriber's profile (e.g., CFNR to local agent, OCSI if possible).

Thereafter, PI VAM 102 sends a PRN request to MSC-H/VLR-H 106 and receives the MSRN details in return. Subsequently, PI VAM 102 sends a MAP-RESET message after each PRN request in order to ensure the flag "Location Information Confirmed in HLR" remains as "not confirmed" for the duration of the roaming test. It ensures that a "Return to the previous MSC-H/VLR-H from MSC-R/VLR-R" would be detected by PI VAM 102 and the test procedure can be aborted. Since the flag "Location Information Confirmed in HLR" is, per standards, set to "confirmed" at PRN request, it is mandatory to have the RESET done after each PRN request.

Thereafter, PI VAM 102 and PI SIMBox 104 communicate to conduct the roaming tests. The roaming test can last for a configurable time (X times 15 sec, corresponding to the average re-attempt time) afterwards. In one embodiment, to make the roaming test timer consideration independent, the LUP is transformed into an RSD message, and subsequently an ISD message is sent to the new MSC/VLR.

Finally, once the test procedure is complete, PI VAM 102 sends a dummy LUP for updating the MSC-R/VLR-R 122 location at HLR-H 116. In another embodiment, once the timer expires or an MT call is received, the original LUP is released (or allowed) depending on the implementation scenario. However, as PurgeMS was sent at the initiation of the test, PI VAM 102 also sends a Cancel Loc to MSC-H/VLR-H 112 to remove the subscriber's profile after the completion of the roaming test.

In accordance with various other embodiments of the invention, same approach as outlined in FIG. 3 could be used to handle GPRS LUP working with SGSN. Additionally, the benefit would be on MT/MO SMS scenario, which have limited interest for operators. The Network-initiated Data session context relies on the presence of the mobile and hence, there is at PI-level there is no difference between a Path check (GTP-Echo Request/Echo Response) and a PDU Notification and PDU Notification Reject.

As in the current implementation of this PI VAM solution, real subscribers are used as roaming agent; it equips the operators with tracking capabilities. It is hence possible to configure thresholds and testing intervals per IMSI. For example, operator could maintain a blacklist of IMSIs for VIP roamers who cannot be used for these roaming tests. Also, VLRs can be whitelisted so that only standard non-compliant VLRs will involve real subscribers in the tests.

There may be situations of Early Answer Frauds on the MT call or CF leg of the call. In order to avoid such issue from subscriber's end, for MT side, the roaming tests are done on MSRN in order to avoid creation of GMSC CDR. An MT TAP may also be issued only when EAF has occurred on $2^{nd}$ leg of the call. For CF side, the TAP files are discarded for calls towards local agents.

Figure 4:
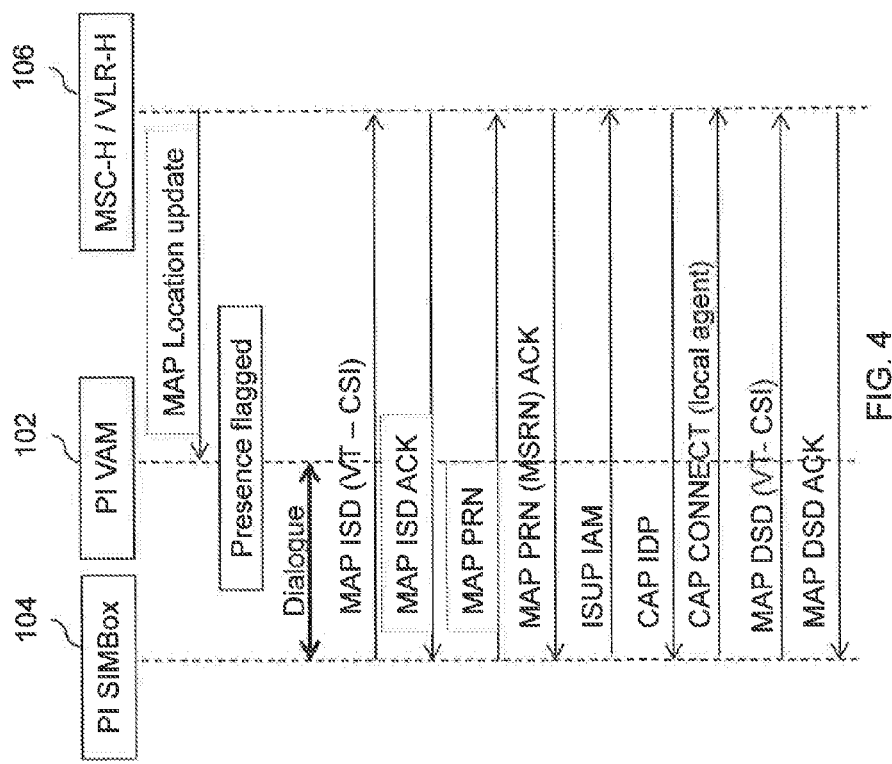
FIG. 4 represents a flow diagram for conducting roaming tests when an MSC/VLR is known to follow Restoration procedure, in accordance with an embodiment of the present invention.

In accordance with another embodiment of the present invention, some MSC/VLR cannot be tested for voice although roaming profile is observed. In other words, PRN message is responded with "No roaming number available" or "System Failure" or any other error while a Restoration Procedure is observed or deducted (i.e., subsequent ISDs are successfully sent). Since Restoration Procedure is observed, "profile download" or "profile change" tests may be done using PI SIMBox 104. FIG. 4 represents a flow diagram for conducting roaming tests when an MSC/VLR is known to follow Restoration procedure, in accordance with an embodiment of the present invention. The PI VAM 102 receives a location update message, as it is deployed in in-signaling path. This indicates the roamers presence as registered. Then, PI SIMBox 104 sends an ISD message with a 'VT-CSI' where PI SIMBox 104 acts as gsmSCF. Subsequently, the PI SIMBox 104 initiates a call to the subscriber (real subscriber). PI SIMBox 104 responds to the CAP IDP request from MSC-H/VLR-H 106, with a CAP CONNECT (local agent) message. Thereafter, PI SIMBox 104 releases the call when subscriber is received in HPMN and removes the VT-CSI using MAP DSD (VT-CSI) message. The risk of race condition of an actual call towards the real subscriber at the time of call initiation may be solved using MAP PurgeMS or MAP RESET or MAP MT-FWD-SM (Empty flash) message.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices: (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |

APPENDIX-continued

| Acronym | Description |
| --- | --- |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |

APPENDIX-continued

| Acronym | Description |
| --- | --- |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-N | HPMN SMSC |
| SoR | Steering of Roaming |
| SPC | Signal Point Code |
| SRI | MAP Send Routing Information |
| SRI-SM | MAP Send Routing Information For Short Mssages |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Intercharge Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | Use Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

TECHNICAL REFERENCES

John Jiang and David Gillot [PI 2007] A single operator and network side solution for inbound and outbound roaming tests and discoveries of roaming partner services and frauds without involving remote probes or real roamer traffic—Phase 1

John Jiang and David Gillot [PI 2008] A single operator and network side solution for inbound and outbound roaming tests and discoveries of roaming partner services and frauds without involving remote probes or real roamer traffic GSM 378 Camel Phase 2

Camel 978 Camel Application Protocol

GSM 379 on CAMEL Support of Optimal Routing (SOR)

GSM 318 Basic Call Handling

IREG 32

IREG 24

ITU-T Recommendation Q.1214 (1995), Distributed functional plane for intelligent network CS-1;

ITU-T Recommendation Q.1218 (1995), Interface Recommendation for intelligent network CS-1;

ITU-T Recommendation Q.762 (1999), Signaling system No. 7—ISDN user part general functions of messages and signals;

ITU-T Recommendation Q.763 (1999), Signaling system No. 7—ISDN user part formats and codes;

ITU-T Recommendation Q.764 (1999), Signaling system No. 7—ISDN user part signaling procedures;

ITU-T Recommendation Q.766 (1993), Performance objectives in the integrated services digital network application;

ITU-T Recommendation Q.765 (1998), Signaling system No. 7—Application transport mechanism;

ITU-T Recommendation Q.769.1 (1999), Signaling system No. 7—ISDN user part enhancements for the support of Number Portability BA 19 GSMA RAEX on AA 14 and IR 21

FF 17 International Revenue Share Fraud

We claim:

1. A method for facilitating roaming tests for an operator in a telecommunication network, the method comprising:

detecting a location update message of a subscriber to an HLR while switching from a first MSC/VLR to a second MSC/VLR;

holding by a value added module, a cancel location message being sent from the HLR to the first MSC/VLR during a period of conducting the roaming tests; and conducting the roaming tests, during a period of time while switching from the first MSC/VLR to the second MSC/VLR, on the first MSC/VLR which is a non-compliant MSC/VLR that does not follow a Restoration Procedure, by the value added module using the subscriber's profile data obtained from the first MSC/VLR.

2. The method of claim 1 further comprising releasing by the value added module, the cancel location message to the first MSC/VLR upon completion of the roaming tests.

3. The method of claim 1, wherein the location update request is detected by one of:
  detecting the location update request using a probe;
  receiving the location update request from an active NTR system; and
  receiving the location update request due to routing by a STP.

4. The method of claim 3, wherein the STP is dynamically configured with E.214 to send the location update request to the value added module.

5. The method of claim 1, wherein the first MSC/VLR belongs to the same network or a different network as the second MSC/VLR.

6. The method of claim 1, wherein the value added module conducts interfaces with a Predictive Intelligence (PI) module to execute one or more steps of claim 1.

7. The method of claim 1, wherein the location update request is one of a GSM location update or GPRS location update.

8. The system of claim 1, wherein the subscriber's profile data is obtained by sending a MAP RSD message to the first MSC/VLR.

9. The method of claim 1 further comprising sending an ISD message to the first MSC/VLR.

10. The method of claim 1 further comprising sending a PRN message to the first MSC/VLR.

11. The method of claim 1 further comprising sending a MAP RESET message to the first MSC/VLR.

12. The method of claim 1 further comprising sending a CAP Connect to the first MSC/VLR.

13. The method of claim 1 further comprising sending a MAP DSD message with VT CSI to the first MSC/VLR.

14. A method for facilitating roaming tests for an operator in a telecommunication network, the method comprising:
  detecting a location update message of a subscriber to an HLR while switching from a first MSC/VLR to a second MSC/VLR;
  sending by a value added module, an RSD message to the HLR to relay the subscriber's profile to the second MSC/VLR;
  sending by the value added module, a purge message on the subscriber to the HLR;
  conducting the roaming tests, during a period of time while switching from the first MSC/VLR to the second MSC/VLR, on the first MSC/VLR which is a non-compliant MSC/VLR that does not follow a Restoration Procedure, by the value added module using the subscriber's profile data obtained from the first MSC/VLR;
  sending by the value added module, a cancel location message to the first MSC/VLR to remove the subscriber's profile in the first MSC/VLR; and
  generating by the value added module, a location update message to update second MSC/VLR at the HLR.

15. The method of claim 14, wherein the value added module conducts interfaces with a Predictive Intelligence (PI) module to execute one or more steps of claim 13.

16. The method of claim 14 further comprising sending an ISD message to the first MSC/VLR.

17. The method of claim 14 further comprising sending a PRN message to the first MSC/VLR.

18. The method of claim 14 further comprising sending a MAP RESET message to the first MSC/VLR.

19. The method of claim 14 further comprising sending a CAP Connect to the first MSC/VLR.

20. The method of claim 14 further comprising sending a MAP DSD message with VT CSI to the first MSC/VLR.

21. A system for facilitating roaming tests for an operator in a telecommunication network, the system comprising:
  a value added module that detects a location update message of a subscriber to an HLR while switching from a first MSC/VLR to a second MSC/VLR;
  the value added module further holds a cancel location message being sent from the HLR to the first MSC/VLR during a period of conducting the roaming tests; and
  the value added module further conducts the roaming tests, during a period of time while switching from the first MSC/VLR to the second MSC/VLR, on the first MSC/VLR which is a non-compliant MSC/VLR that does not follow a Restoration Procedure, using the subscriber's profile data obtained from the first MSC/VLR.

22. The system of claim 21, wherein the value added module further releases the cancel location message to the first MSC/VLR upon completion of the roaming tests.

23. The system of claim 21, wherein the value added module detects the location update request using one of:
  a probe to detect the location update request;
  an active NTR system to receive the location update request; and
  a STP to route the location update request.

24. The system of claim 22, wherein the STP is dynamically configured with E.214 to send the location update request to the value added module.

25. The system of claim 21, wherein the first MSC/VLR belongs to the same network or a different network as the second MSC/VLR.

26. The system of claim 21, wherein the value added module conducts interfaces with a Predictive Intelligence (PI) module to execute one or more steps of claim 1.

27. The system of claim 21, wherein the value added module further sends an ISD message to the first MSC/VLR.

28. The system of claim 21, wherein the value added module further sends a PRN message to the first MSC/VLR.

29. The system of claim 21, wherein the value added module further sends a MAP RESET message to the first MSC/VLR.

30. The system of claim 21, wherein the value added module further sends a CAP Connect to the first MSC/VLR.

31. The system of claim 21, wherein the value added module further sends a MAP DSD message with VT CSI to the first MSC/VLR.

32. The system of claim 21, wherein the value added module further obtains the subscriber's profile data by sending a MAP RSD message to the first MSC/VLR.

33. The system of claim 21, wherein the location update request is one of a GSM location update or GPRS location update.

* * * * *